(12) United States Patent
Monaghan et al.

(10) Patent No.: US 12,373,791 B2
(45) Date of Patent: Jul. 29, 2025

(54) SELF-SERVICE TERMINAL

(75) Inventors: Andrew Monaghan, Dundee (GB); Richard Han, Angus (GB)

(73) Assignee: NCR Atleos Corporation, Atlanta, GA (US)

( * ) Notice: Subject to any disclaimer, the term of this patent is extended or adjusted under 35 U.S.C. 154(b) by 3519 days.

(21) Appl. No.: 11/315,900

(22) Filed: Dec. 22, 2005

(65) Prior Publication Data

US 2007/0150364 A1    Jun. 28, 2007

(51) Int. Cl.
*G06Q 30/0601* (2023.01)
*G06Q 10/10* (2023.01)

(52) U.S. Cl.
CPC ......... *G06Q 10/10* (2013.01); *G06Q 30/0601* (2013.01)

(58) Field of Classification Search
CPC ... G06Q 10/10; G06Q 30/0601; G07F 19/211
USPC ..................... 705/59, 26; 345/473
See application file for complete search history.

(56) References Cited

U.S. PATENT DOCUMENTS

| | | | |
|---|---|---|---|
| 5,835,693 A * | 11/1998 | Lynch et al. ............... | 345/473 |
| 6,121,960 A * | 9/2000 | Carroll ................ | G06F 1/1626 |
| | | | 345/169 |
| 6,923,371 B2 * | 8/2005 | Goodfellow ............ | 235/382 |
| 7,007,295 B1 * | 2/2006 | Rose et al. .............. | 725/86 |
| 7,080,036 B1 * | 7/2006 | Drummond et al. ........ | 705/42 |
| 7,106,275 B2 * | 9/2006 | Brunner et al. .......... | 345/32 |
| 7,133,658 B2 * | 11/2006 | Imagawa et al. .......... | 455/403 |
| 7,348,984 B1 * | 3/2008 | Iwata .................... | G06T 13/40 |
| | | | 345/473 |
| 7,432,940 B2 * | 10/2008 | Brook et al. ............. | 345/629 |
| 7,472,910 B1 * | 1/2009 | Okada et al. ............ | 463/43 |
| 7,606,767 B1 * | 10/2009 | Couper ............. | G06Q 20/1085 |
| | | | 705/41 |
| 2001/0043235 A1 * | 11/2001 | Best et al. ............. | 345/781 |
| 2002/0035541 A1 * | 3/2002 | Makino et al. .......... | 705/43 |

(Continued)

FOREIGN PATENT DOCUMENTS

JP        09326001 A    * 12/1997

OTHER PUBLICATIONS

"collate".Webster's Third New International Dictionary, Unabridged, 1993. [online][retrieved on May 7, 2009]. Retrieved from: http://lionreference.chadwyck.com/searchFulltext.do?id=6855082&idType=offset&divLevel=2&queryId=../session/1241728061_3691&area=mwd&forward=refshelf&trail=refshelf.*

(Continued)

*Primary Examiner* — Mario C. Iosif
(74) *Attorney, Agent, or Firm* — Schwegman Lundberg & Woessner, P.A.

(57) ABSTRACT

A self-service terminal comprising: application flow logic which collates information provided by a user of the terminal; configuration information associated with each of a plurality of individually-controllable layers, and a presentation component responsive to the application flow logic. The presentation component operates on the configuration information for each layer to simultaneously render the plurality of layers on a display as a single screen while continuing to operate independently on each layer being displayed. The configuration information may include both instructions and content, and the presentation component may use the instructions to access advanced graphical manipulation routines for operating on the content.

18 Claims, 5 Drawing Sheets

(56) References Cited

U.S. PATENT DOCUMENTS

| | | | |
|---|---|---|---|
| 2003/0103030 A1* | 6/2003 | Wu | 345/102 |
| 2005/0187741 A1* | 8/2005 | Gilbert | 703/2 |
| 2005/0192851 A1* | 9/2005 | Rangnekar | 705/5 |
| 2005/0231512 A1* | 10/2005 | Niles | G06T 13/20 |
| | | | 345/473 |
| 2006/0048164 A1* | 3/2006 | Fry | G06F 3/14 |
| | | | 719/328 |
| 2006/0103655 A1* | 5/2006 | Nelson | G06F 40/143 |
| | | | 345/473 |
| 2006/0232589 A1* | 10/2006 | Glein | G06T 13/00 |
| | | | 345/473 |
| 2007/0074114 A1* | 3/2007 | Adjali | G06F 3/01 |
| | | | 715/706 |
| 2007/0109306 A1* | 5/2007 | Clark | G06K 15/1806 |
| | | | 345/501 |

OTHER PUBLICATIONS

White, Ron, How Computers Work, 7th Ed., Que Corporation, Oct. 15, 2003.*

Compaq. (2000). "Web-Enabled ATMs. In: Electronic Banking." Vieweg+Teubner Verlag. Retrieved from the Internet on Oct. 2, 2023. Retrieved from: <URL: https://doi.org/10.1007/978-3-322-86627-1_21>. (Year: 2000).*

Malkewitz, R., and K. Richter. "XML Used for Remote Control of Public Kiosk Systems (POI, POS),"—1, 2001. Retrieved from the Internet on Oct. 2, 2023. Retrieved from: <URL: https://publica.fraunhofer.de/handle/publica/337983.> (Year: 2001).*

\* cited by examiner

```xml
<Element Name="BackgroundText">
  <Text Text="please enter" />
  <Position X="-3.6" Y="1.35" Z="-0.1" />
  <Scale X=".8" Y=".8" />
  <Alpha Alpha="0.0" />
</Element>

<Element Name="BackgroundText2">
  <Text Text="your card" />
  <Position X="-3.6" Y="1.05" Z="-0.1" />
  <Scale X=".6" Y=".6" />
  <Alpha Alpha="0.0" />
</Element>
```
100

```xml
<Animation Id="Enter.TextSelect">
  <Keyframe Time="1">
    <Position X="-1.6" Y="1.35" Z="-0.1" />
    <Alpha Alpha="0.5" />
  </Keyframe>
</Animation>

<Animation Id="Enter.TextAmount">
  <Keyframe Time="1">
    <Position X="-0.6" Y="1.05" Z="-0.1" />
    <Alpha Alpha="0.5" />
  </Keyframe>
</Animation>
```
104

```xml
<Sequence Name="LayerEnter">
  <Animations Element="BackgroundText" AnimationId="Enter.TextSelect" />
  <Animations Element="BackgroundText2" AnimationId="Enter.TextAmount" />
</Sequence>
```
106

SELF-SERVICE TERMINAL

BACKGROUND

SSTs are public-access terminals that are used by members of the public to conduct transactions and/or to receive information. SSTs are typically ruggedized, tamper resistant, and include software with advanced error handling capabilities to ensure that the SST is inherently resilient. One common type of SST is an automated teller machine (ATM).

An ATM allows a user to conduct a financial transaction or to view financial information by providing an "application flow" (sometimes referred to as a "transaction flow"). The term "application flow" has a specific meaning in the field of self-service terminals. An "application flow" comprises: (i) the sequence of screens that are (or may be) presented to a user to gather information from the user to fulfill the user's request, and (ii) the logic that controls which screen is displayed, that branches to the next screen to be displayed, that collates inputs received from the user, and that fulfils the transaction. "Application flow" can refer to the actual sequence of screens seen by the user, or to a combination of the sequence of screens and the logic (software) that controls the screens and collates the user inputs.

The term "screen" is used herein to denote the graphics, text, controls (such as menu options), and such like, that are presented on an ATM display; the term "screen" as used herein does not refer to the hardware (that is, the display) that presents the graphics, text, controls, and such like. Thus, "screen" refers to content, and "display" refers to hardware that presents the content.

When a transaction is being entered at an ATM, a series of screens are presented in succession on the ATM display to lead a user through a transaction, the next screen displayed being dependent on a user entry or activity relating to the current screen. Each screen in the sequence represents a state within a given "application flow". For example, a first screen may request a user to insert a card; once a card has been inserted the application flow logic advances to a second screen that may invite the user to enter his/her PIN; once the final digit of the PIN has been entered, the application flow logic advances to a third screen that may invite the user to select a transaction from a list of transactions; and so on until the transaction is fulfilled.

ATMs include a program for displaying the screens to a user. In the past, ATMs wrote to a frame buffer (video RAM) which presented the screens on a display. Many new ATMs use a presentation client in the form of a Web browser to present the screens on the display. Although referred to as a Web browser, ATMs typically use a browser component (which does not include toolbars and such like) but the term "Web browser" will be used herein in a generic sense to refer to both a Web browser and a Web browser component.

Most of these new ATMs use a Windows (trade mark) operating system. In these ATMs, the Web browsers use an API in the Windows (trade mark) operating system called GDI (Graphics Device Interface). When the Web browser wants to display a screen, the browser makes a call to a GDI function and sends the parameters for the screen that is to be created. GDI in turn "draws" the screen by sending commands to the display drivers, which actually render the screen on the display. Because Web browsers rely on GDI, they are not capable of providing a rich graphical interface for multi-media content.

Web browsers can present multi-media files, but these are always presented in the context of a single screen. For example, if a video file, such as an MPEG video file, is to be displayed, then this is a single, visual component, within a given screen in the "application flow". That is, the video file is played in a single screen until it is finished, then the next screen is displayed. Thus, a video file is not an application flow as the term is used in the self-service terminal field, but rather part of an application flow, namely, an object on a screen. Furthermore, the video file cannot persist from one screen to the next, because the video file is dedicated to a single screen.

In current ATMs, the application flow is provided by a sequence of individual screens, each screen having content associated with that screen. This means that the application flow is complex and difficult to change. It also means that ATMs cannot harness the high definition graphics capabilities available to modern personal computers.

It is among the objects of an embodiment of the present invention to provide an ATM with a configurable graphical display that enables high definition graphics and animations to be used.

SUMMARY

According to a first aspect of the present invention there is provided a self-service terminal comprising: application flow logic which collates information provided by a user of the terminal; configuration information associated with each of a plurality of individually-controllable layers, and a presentation component responsive to the application flow logic, and which operates on the configuration information for each layer to simultaneously render the plurality of layers on a display as a single screen while continuing to operate independently on each layer being displayed.

By simultaneously rendering the plurality of layers on a display as a single screen, the presentation component provides an information flow to guide a user through a transaction or a request for information. In contrast to an application flow, an information flow does not have a sequence of screens, rather it has information appearing on, and disappearing from, the same screen.

Although the word layer is used herein to describe a content object or a group of content objects, it should be appreciated that a layer may be considered by the presentation component as a three-dimensional model that is rendered on a display in two dimensions.

Preferably, the presentation component renders the layers on the display at a rate of at least thirty frames per second.

The configuration information may include instructions and content. The instructions may be parsed by the presentation component to render the content according to the instructions. The instructions may relate to initial position, opacity, scale, final position, transformations, and such like.

The configuration information may be provided in the form of one or more configuration files. The one or more configuration files may be provided in a mark-up language format, such as XML, which includes the instructions and a reference (pointer) to the content (and/or the content itself, for example, where the content is text).

In one embodiment, each layer may have a dedicated configuration file.

Where a mark-up language is used for the configuration information, the presentation component interprets the instructions and renders the content accordingly.

The instructions may include keyframes enabling a user to apply pre-defined operations to content. These pre-defined operations may include: scale (larger or smaller), rotate, fade, move by a relative amount, move by an absolute amount, change opacity, a time over which such operations will be performed, and such like.

The keyframes may be applied individually to pixels in a layer or to objects on a layer. The parser may access graphics library files (such as DLLs) to implement the operations. Providing keyframes allows a user to apply pre-defined operations without having to understand the low-level commands needed to implement the pre-defined operations. Keyframes can be considered as providing an API to the configuration file; the presentation component being hard-coded to implement the functions referenced by the keyframes.

For a content object that is either an image or text, and which will be animated (that is, the text or image will change in some way over time), a keyframe will define: an end position (relative or absolute) for the object, growth or shrinkage of the object, time during which the end position will be reached, opacity as a function of position or time, and such like.

The presentation component may be a program or a component of a program. The presentation component and the application flow logic may be provided as a single monolithic program, but it is advantageous to separate them as different components or different programs because this allows different presentation mechanisms (a Web browser, direct writing to a frame buffer, or the presentation component) to be used without changing the application flow logic.

Content may include static images, text, dynamic text, and video. Content may be animated. As used herein, animation does not refer to a video file. Animations are programmable transformations that can be applied to content, irrespective of whether the content is images, text, or video. Animations cause a change to combinations of position, scale, and transparency of one or more objects on a layer over a pre-defined time. A video file may be animated by changing the opacity of the frames in the video over time, by changing the position of the frames (if the frame does not fill the display area). However, a video file that is played at a location on the display, that does not change position, opacity, and such like while it is being played, and stops when it reaches the end, is not "animated", as the term is used herein.

Content may include multiple objects on a layer or only one object. For example, a video file is a video object; an image may be a graphical object or a mosaic of multiple graphical objects; a word or phrase is a text object; an audio file is an audio object; all of the preceding, considered individually or all taken together, comprise content.

The terminal may include a touch panel in registration with the display, thereby allowing the presentation component to present one or more touch-selectable controls on a layer and to provide the application logic with an indication of the control corresponding to the area of the display that was touched by a user.

When executed, the presentation component may load the configuration information into memory associated with a processor executing the presentation component. In a preferred embodiment, the presentation component provides an application programming interface (API) to allow another program (such as the application flow logic) to: (i) load the configuration information into memory; (ii) initiate the information flow; (iii) remove a layer from the information flow; (iv) modify content on a layer; (v) change the keyframe or keyframes applied to content on a layer; (vi) animate content on a layer, and such like. The API may also be used by the presentation component to: (i) inform the program when a user has touched a touch panel; (ii) inform the program about what object or area of the display has been touched; (iii) inform the program when an animation has finished; or such like. This enables the application flow logic to know when a user selects an option and what option the user has selected.

Each object of content may have a unique identification to allow the API to convey commands referencing the identification. Each layer may have a unique identification—where individual files are used for each layer, the unique identification may be the filename of the file. Each keyframe may also have a unique identification. This allows a program to send commands to operate on an object or a layer using the unique identification for that object or layer.

When used in a Windows (trade mark) environment, the presentation component may access a video mixing renderer (VMR), such as VMR9. It should be appreciated, however, that this aspect of the invention is also suitable for use with other operating systems, such as Linux (trade mark), Solaris (trade mark), and Mac (trade mark) operating systems, and such like.

By virtue of this aspect of the invention a presentation component is provided that can access highly-configurable graphics capabilities in a graphics adapter to provide a transition-less user interface to the SST user. Because the presentation component is not a traditional Web browser, it can simultaneously present multiple layers on a single screen, where each layer is controlled separately from the other layers. This allows, for example, a background layer (L1) to have an image, or an animation. A second layer (L2) can be rendered in front of the background image (L1) and can have text that obscures part, but not all, of the background image (L1) and transparent portions through which the background layer (L1) is visible. A third layer (L3) can also be provided in front of L2. L3 can include controls aligned with, and corresponding to, the text in L2, and such like. This enables the text on L2 to be modified (faded out, enlarged, rotated, or such like) independently of the background image, and independently of the controls. This allows, for example, a video to play continuously (in the background) on the screen while instructions are presented to the user on a different layer of the same screen, and then removed, transaction options are presented on yet another layer of the same screen, and then removed, and the transaction is authorized. It is not possible to do this with a Web browser because the Web browser relies on GDI, which cannot independently control multiple layers (only multiple objects) in a single screen.

When the presentation component is used in a Windows (trade mark) environment, the presentation component may access the DirectX (trade mark) API. DirectX provides an interface which allows access to the graphics adapter's frame buffer directly and which also allows access to advanced features of the display adapter, thereby exposing low-level functions of the graphics adapter to the presentation component. DirectX allows programs to interface with and use built in high speed 3D graphic routines on graphic cards for faster processing. These features are typically not provided in the standard Windows GDI graphics interface.

As used herein, a layer refers to a logical three-dimensional model of one or more content objects. The layer is typically (but not necessarily) transparent where no content object is located, and may have a degree of transparency where the content object is located.

It will now be appreciated that this aspect of the invention provides a terminal that can present a single screen of information that changes as a user progresses through a transaction instead of the conventional sequence of screens flipping from one screen to the next as a transaction proceeds.

It should be appreciated that a conventional application logic flow may be modified to interact with the presentation component provided by this aspect of the invention. This allows the presentation of information to be separate from, and independent of, the application flow logic.

According to a second aspect of the present invention there is provided a method of presenting information to a user, the method comprising: accessing configuration information associated with each of a plurality of individually-controllable layers, and operating on the configuration information for each layer to simultaneously render the plurality of layers on a display as a single screen, and modifying at least one layer in response to an input received from the user.

The method may include removing a layer when the information provided by that layer is no longer required for a transaction.

The step of modifying at least one layer in response to an input received from the user may include fading out controls and/or text presented on that layer.

The method may include: modifying multiple layers in response to a user input.

The method may include receiving a signal from a touch panel indicative of an area of the display touched by the user, determining which layer and which control this touch corresponds to, and informing application flow logic of the control selected by the user.

The step of operating on the configuration information for each layer may include interpreting instructions provided in a configuration file.

The step of interpreting instructions provided in the configuration file may include interpreting keyframe instructions and applying them to content referenced by the file.

The method may include receiving a command to update a content object and receiving updated information, and modifying the content object to include the received updated information.

The method may include receiving commands to display a layer, to animate one or more content objects on the displayed layer, to remove a layer, and/or to remove a layer from memory.

According to a third aspect of the present invention there is provided a presentation component which simultaneously renders a plurality of layers on a display as a single screen, the presentation component comprising: an interpreter for interpreting configuration information associated with each of the plurality of layers; a command interface which (i) receives commands from a control program to transform a layer in response to a user activity, and which (ii) conveys status information to the control program.

According to a fourth aspect of the present invention there is provided an automated teller machine including a presentation program which accesses a video mixing renderer to implement instructions on a graphics adapter.

These and other aspects of the present invention will be apparent from the following specific description, given by way of example, with reference to the accompanying drawings.

Detailed Description

Figure 1:
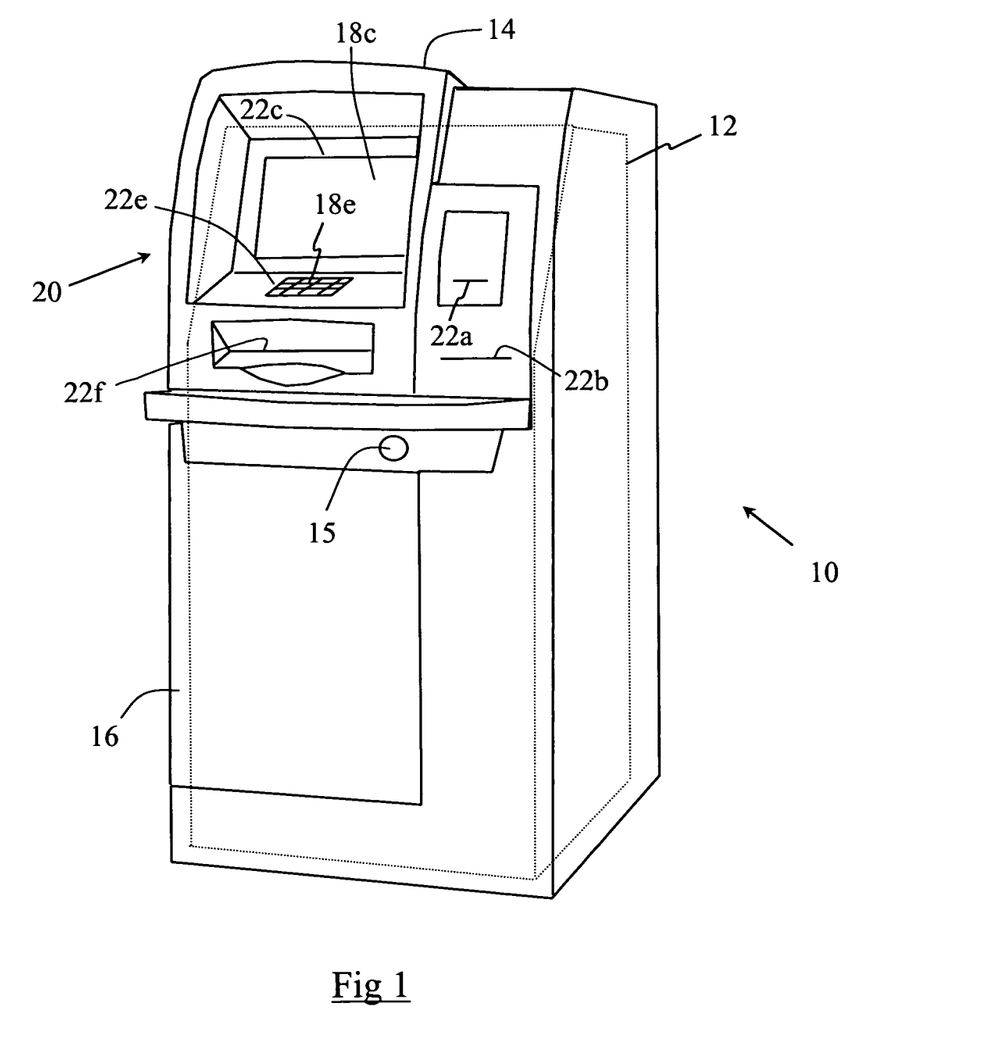
FIG. 1 is a perspective view of a self-service terminal including a presentation component for presenting information to a user of the terminal according to one embodiment of the present invention.
Figure 2:
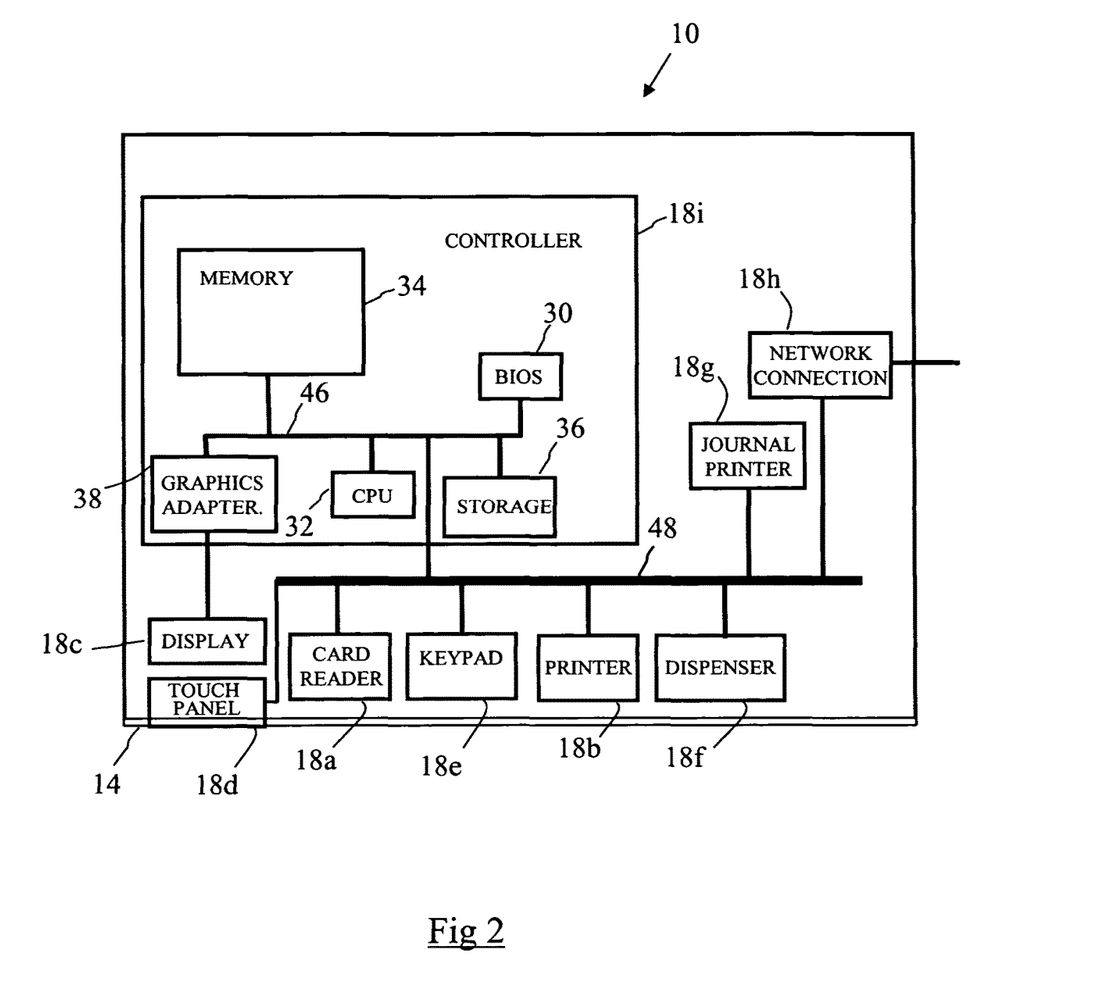
FIG. 2 is a simplified block diagram illustrating the system architecture of the terminal of FIG. 1.

Reference is first made to FIG. 1, which is a perspective view of a self-service terminal, in the form of a lobby ATM 10, executing a presentation component according to one embodiment of the invention. Reference is also made to FIG. 2, which is a schematic diagram illustrating the ATM 10 of FIG. 2 and showing internal devices mounted therein.

The ATM 10 has a chassis 12 (shown in dotted line) to which is pivotably coupled a plastic fascia 14 covering an upper portion of the chassis 12, and secured thereto by a lock mechanism 15. A door 16 is hingeably coupled to a lower portion of the chassis 12. When the fascia 14 is unlocked and hinged open and the door 16 is swung open, an operator can gain access to devices 18 located within the ATM 10.

The fascia 14 provides part of a user interface 20 to allow a user to interact with the ATM 10. In particular, the fascia 14 has apertures 22 aligning with some of the devices 18 when the fascia 14 is pivoted to the closed position.

The fascia 14 defines: a card reader slot 22*a* aligning with a card reader device 18*a*; a receipt printer slot 22*b* aligning with a receipt printer device 18*b*; a display aperture 22*c* aligning with a display 18*c* and an associated touch sensitive panel 18*d* mounted on, and in registration with, the display 18*c*; a keypad aperture 22*e* through which an encrypting keypad device 18*e* protrudes; and a dispenser slot 22*f* aligning with a dispenser device 18*f* in the form of a cash dispenser.

Referring now to FIG. 2, the ATM 10 also includes the following internal devices 18 that are not directly viewed or accessed by a user during the course of a transaction. These devices 18 include: a journal printer device 18*g* for creating a record of every transaction executed by the ATM 10, a network connection device 18*h* for accessing a remote authorization system (not shown), and a controller device 18*i* (in the form of a PC core) for controlling the operation of the ATM 10, including the operation of the other devices 18. These devices 18*g,h,i* are all mounted within the chassis 12 of the ATM 10.

The controller 18*i* comprises a BIOS 30 stored in non-volatile memory, a microprocessor 32, associated main memory 34, storage space 36 in the form of a magnetic disk drive, and a graphics adapter 38 in the form of a high performance graphics card, such as one of the GeForce (trademark) range from NVIDIA (trade mark).

The BIOS 30, microprocessor 32, main memory 34, disk drive 36, and graphics card 38 are all replaceable modules within the controller device 18*i*.

The display 18c is connected to the microprocessor 32 via the graphics card 38 installed in the controller 18i and one or more internal controller buses 46. The other ATM devices (18a, b, and 18d to 18h) are connected to the ATM controller 18i via a device bus 48 (in the form of USB) and the one or more internal controller buses 46.

Initialization of the ATM

Figure 3:
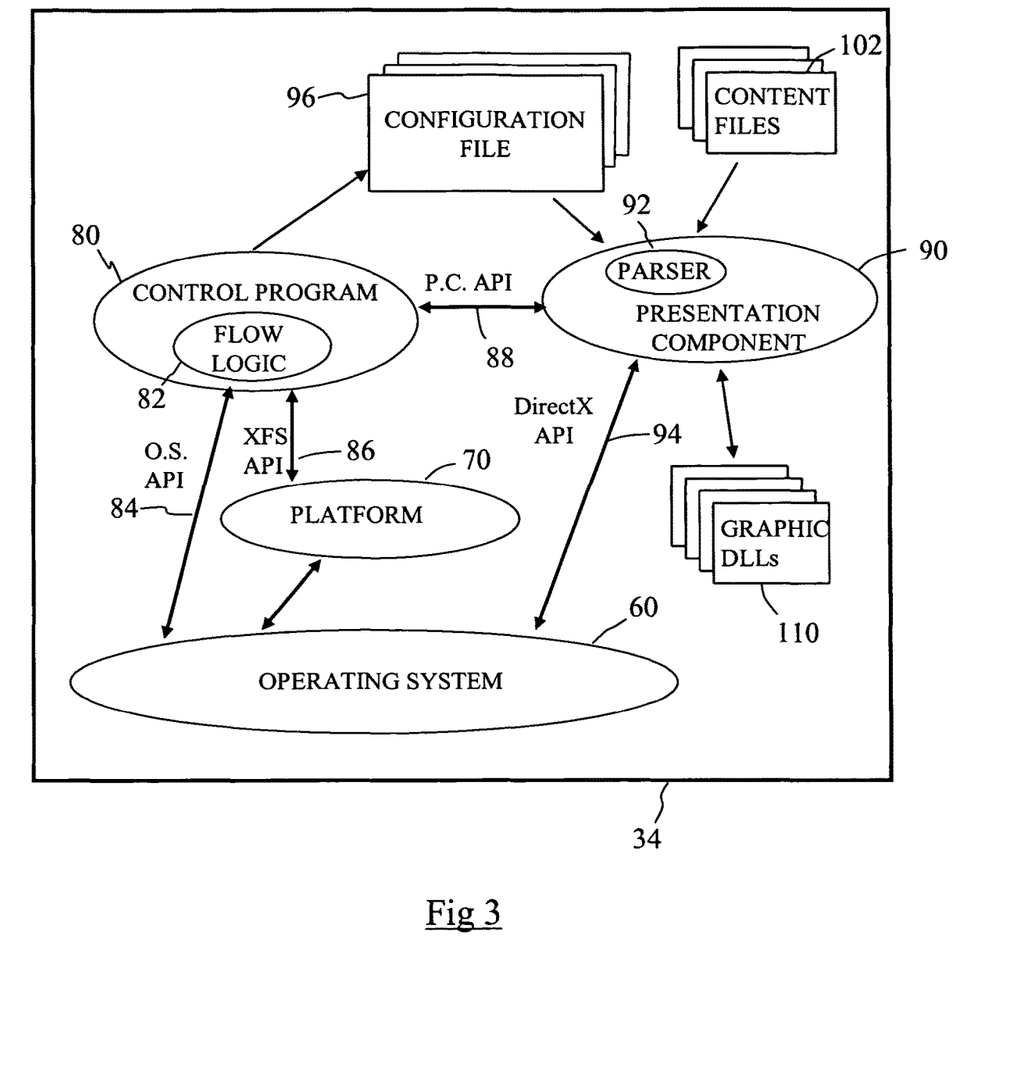
FIG. 3 is a schematic diagram illustrating software components (including the presentation component) executing in a memory of the terminal of FIG. 1.

When the ATM 10 is booted up, the microprocessor 32 accesses the magnetic disk drive 36 and loads the main memory 34 with software components, as will be described with reference to FIG. 3, which is a schematic diagram illustrating how software components interact in main memory 34.

The software components loaded include: an operating system kernel 60, a run-time platform 70, a control program 80, and a presentation component 90. Each of these will now be described in turn.

In this embodiment, the operating system is a Windows NT (trade mark) operating system, available from Microsoft Corporation. The operating system 60 includes a plurality of device drivers (not shown) for interfacing with standard computing devices such as the magnetic disk drive 36, the display 18c, a serial port, a parallel port, and such like. As is well known in the art, the operating system kernel 60 is responsible for memory, process, task, and disk management, and includes routines for implementing these functions.

In this embodiment, the runtime platform 70 is a set of APTRA (trade mark) XFS components, available from NCR Corporation, 1700 S. Patterson Blvd., Dayton, OH 45479, U.S.A. The run-time platform 70 provides a range of programming facilities specific to self-service terminal devices and services, such as the cash dispenser 18f and the journal printer 18g.

One function of the run-time platform 70 is to enhance the operating system 60 so that the operating system and run-time platform 70 together provide high level access to all of the devices 18, including both standard computing devices (via the operating system 60), and non-standard computing devices (via the run-time platform 70). Thus, the combination of the run-time platform 70 and the operating system 60 can be viewed as providing a complete ATM operating system.

The control program 80 provides transaction processing functions (for customers and for maintenance personnel) and device management functions (for monitoring the status of the devices 18). The transaction processing functions include application flow logic 82 that performs two main functions. Firstly, the application flow logic 82 collates information from a customer to conduct a transaction for that customer. Secondly, the application flow logic 82 controls the presentation of information to a customer by sending commands to the presentation component 90.

The control program 80 interacts with other software components in memory 34 via three main interfaces.

The first of these three interfaces is to the operating system 60, and is an industry-standard interface 84 (the Windows API).

The second of these three interfaces is to the platform 70, and is an open interface 86. The open interface 86 is a standard interface for making use of self-service devices 18 (referred to herein as a CEN XFS API). This CEN XFS interface 86 is used to instruct the devices 18 to perform operations, and is also used to obtain device status and fault management information.

The third of these three interfaces is to the presentation component 90, and is a proprietary interface, referred to herein as the presentation component interface 88 (P.C. API). Using this P.C. API 88, the application flow logic 82 sends commands to, and receives status information from, the presentation component 90. In this embodiment, the P.C. API 88 supports the following commands: Show, Remove, Update, Animate, Touch, and Loop. These commands will be described in more detail hereafter.

The presentation component 90 (which is a DLL file in this embodiment) includes a parser 92 that interprets instructions (as will be described in more detail below) into low-level graphics commands, and sends these low-level graphics commands to the graphics card 38 via a special low-level graphics interface (in this embodiment, the DirectX API) 94. The DirectX API 94 allows the presentation component 90 to send instructions to a video mixing renderer (in this embodiment, VMR9), which allows simultaneous presentation of complex graphical information on the display 18c.

Operation of the ATM

During operation of the ATM 10, the presentation component 90 presents information to a customer in response to commands received from the application flow logic 82. Each command received from the application flow logic 82 (via P.C. API 88) references either (i) one or more content objects, using a unique identification per content object; or (ii) a layer comprising one or more content objects, using a unique identification for the layer. The presentation component 90 then applies this received command to (i) the referenced object or objects; or (ii) the referenced layer.

One of the main benefits of this embodiment is that the presentation component 90 is able to operate on each content object independently, and display multiple content objects simultaneously, because the presentation component 90 handles each content object (or a group of content objects) as a layer, and presents multiple layers simultaneously. This will now be explained in more detail.

The presentation component 90 accesses configuration information 96, in the form of a plurality of XML configuration files. By accessing the configuration files 96, the presentation component 90 determines what content object (or layer) is being referenced by the received command, and (for some commands) determines what operations need to be performed to implement the received command.

Figure 4:
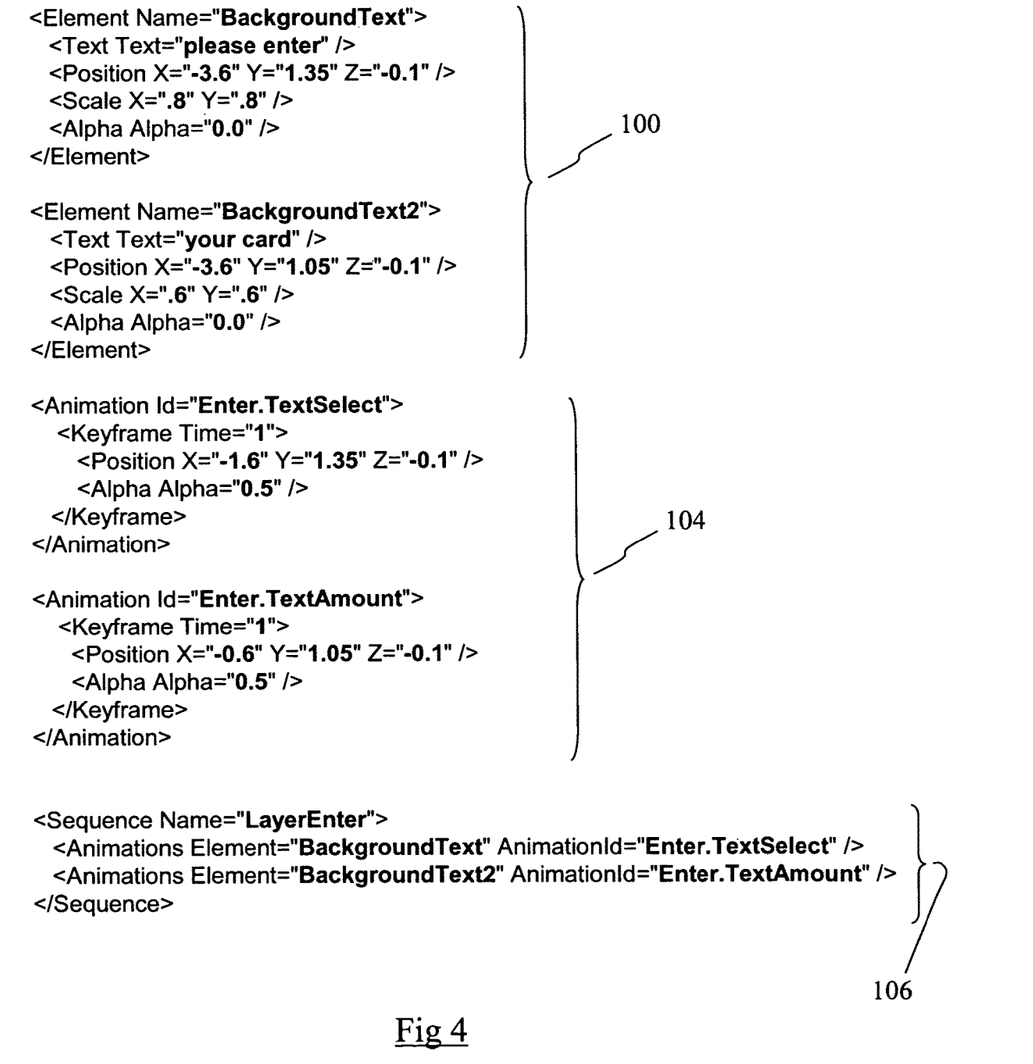
FIG. 4 is part of a configuration file for use by the presentation component in the terminal of FIG. 1.

Part of an XML configuration file 96 corresponding to one layer (the card insertion layer) is illustrated in FIG. 4. There are three main parts to this configuration file 96.

The first part (introductory part) 100 introduces graphical elements (content objects). For each graphical element (content object), the introductory part provides: (i) a name; (ii) the content corresponding to the name (which may be a reference to a content file 102 (FIG. 3) or just text); (iii) a starting position in three dimensions (using X, Y, and Z co-ordinates); (iv) a scale by which the content is magnified or shrunk; (v) and an alpha value, which represents the degree of opacity of the content at the starting position. An alpha value of one means that the content is completely opaque, an alpha value of zero means that the content is completely transparent, and an alpha value between zero and one represents the degree of opacity on a linear scale.

It should be appreciated that the co-ordinates provided above are three-dimensional because the presentation component creates a three-dimensional model of content, which is rendered in two-dimensions on the display 18c. The position in three dimensions is the initial position of the content (that is, the position at which the content will be displayed before any animation is applied to the content).

In the example shown in FIG. 4, two graphical elements are introduced. The name of the first graphical element is "BackgroundText" and the corresponding content is the text "please enter"; the name of the second background element is "BackgroundText2" and the corresponding content is "your card". This will initially be displayed as two lines of text, one above the other, so that the sentence "please enter your card" is displayed. However, because the opacity of each is zero, the text will not initially be visible to a customer viewing the display 18c. In this embodiment, as a default, unless otherwise specified by the configuration file, the text is rendered as Arial font at font size 18.

The second part (animation part) 104 indicates transformations that can be applied to graphical elements (content objects). The transformations are independent of the graphical elements, so that any transformation can be applied to any graphical element. Each transformation (referred to herein as an animation) includes: (i) a unique identification; (ii) a time (referred to as a keyframe time) during which the animation will take place; (iii) a three-dimensional finishing position for the content object; and (iv) an alpha (opacity) value for the content object at the end of the animation (that is, when the animation has been completed).

The animations illustrated in FIG. 4 have the identifications "Enter.TextSelect" and "Enter.TextAmount", and each has a keyframe time of one second.

The third part (sequence part) 106 indicates the sequence of animations that will be applied to the content objects (graphical elements) to ensure that all necessary information, controls, and such like are moved onto (or out of) the screen to provide the customer with an information flow that assists the customer in conducting a transaction. Each entry in the sequence part 106 comprises a content object identification and an animation identification. When the sequence part 106 is activated, the animations listed therein will be applied to the content objects.

When this occurs, as will be seen from the animation part 104, within one second the text "please enter" and the text "your card" will transform from being completely transparent to being 50% opaque (alpha=0.5). Furthermore, within this one second the text "please enter" will move from left to right (from −3.6 to −1.6), and the text "your card" will move from left to right (from −3.6 to −0.6). The customer will observe this text gradually appearing at the left of the display and becoming more opaque as it transitions continuously to the right in a smooth flow.

The keyframes are pre-defined, high-level instructions that describe what transformations will be applied to a content object. When the parser 92 interprets keyframes, the parser 92 translates these keyframes to low-level commands. Keyframes operate in a similar way to macros, in that they provide a simple command for implementing a complex sequence of functions. Keyframes allow the ATM owner to apply an advanced graphical transformation to content objects without having to understand the low-level code needed to implement that advanced graphical transformation.

When the parser 92 interprets keyframes, it accesses a library of graphic manipulation files 110 (in the form of DLLs) to provide the operating system 60 with the low-level commands needed to drive the graphics card 38 and thereby render the animation (such as text scaling) on the display 18c. The DLLs 110 use commands that comply with the DirectX API 94 and instruct the VMR9 component to direct the graphics card 38 to implement the functions described by the keyframes. Additional keyframes can be created by the ATM owner by adding new DLLs to the DLL library 110. These additional keyframes can be given unique names, and the parser 92 can access the new DLLs when it encounters the new unique names.

The content files 102 are typically stored on the disk drive 36 and loaded into memory 34 by the presentation component 90 as required. The content files 102 include images and/or video that can be presented to a customer at the ATM 10, and are created by an owner or operator (not a customer) of the ATM 10.

The XML configuration files 96 are created by the ATM owner or operator, either directly or via an authoring tool.

In a similar way to prior art ATMs, the application flow logic 82 determines what content will be shown. However, in contrast to prior art ATMs, it is the configuration files 96, not the application flow logic 82 that determine how the content will change during a transaction.

An owner of the ATM 10 loads up content onto the ATM 10 (either locally, or preferably across a network) and saves the objects (images, video, audio) as individual content files 102. The configuration files 96 determine how the content objects are presented; whereas, the application logic flow 82, in response to a customer input or activity, determines when the content objects are presented. The configuration files 96 are processed in response to commands received from the application flow logic 82 via the P.C. API 88, as will now be described in more detail.

In this embodiment, one command that can be issued to the presentation component 90 via the P.C. API 88 is the "Show" command. This command is accompanied by a filename corresponding to the configuration file 96 to be loaded by the presentation component 90. This configuration file 96 represents a layer, and typically includes multiple content objects.

On receipt of a Show command, the presentation component 90 loads up the configuration file 96 referenced by the command. When the presentation component 90 loads up this configuration file 96, the parser 92 interprets the introductory part 100 of the file 96 and renders each content object in or referenced by the file 96 according to the instructions provided in the introductory part 100. In the example of FIG. 4, the two content objects (the text "please enter" and the text "your card") are initially transparent, so the customer will not see these content objects when the presentation component 90 implements the Show command for the card insertion layer.

Once the configuration file 96 (layer) has been loaded into memory 34, the application logic flow 82 may send (via the P.C. API 88) an "Animate" command to the presentation component 90 to instruct the presentation component 90 to apply the pre-defined transformations (animations) to the content objects stored in, or referenced by, the loaded configuration file 96.

Whereas the Show command references a layer (a configuration file); the "Animate" command references one or more objects in the configuration file that have been loaded into memory 34. The Animate command does this by referencing the sequence part 106 of the configuration file 96 and providing the particular sequence of animations required (in the example shown in FIG. 4, the only sequence is "LayerEnter". For example, there may be a sequence of animations to move the content objects onto the display 18c, and a sequence of animations to remove the content objects from the display 18c.

On receipt of the Animate command, the parser 92 parsers through the referenced portion of the sequence part 106. The sequence part 106 references the animation part 104, which the parser 92 interprets and uses to access the library of graphic manipulation files 110 so that the presentation component can render the required images on the display 18*c* by sending commands to the graphics card 38 via the DirectX API 94. This causes a smooth transition of the content objects as the customer views the display 18*c*.

Once the content object (or objects) has been animated, and a customer has made a selection or initiated an activity, the content object may have served its purpose so it may be removed or remain presented but in a de-emphasized manner.

De-emphasizing the content object (or objects) may be achieved using an "Animate" command that references a sequence that shrinks the content object and/or makes the content object more transparent.

If all of the content objects in a configuration file 96 have served their purpose in a transaction then the application logic flow 82 may want to free-up resources, such as space in memory 34. To achieve this, the application logic flow 82 can issue (via the P.C. API 88) a Remove command that references the configuration file 96 filename. The presentation component 90 responds to this Remove command by removing the referenced configuration file 96 from memory 34. This command is particularly useful where the content objects are no longer being presented on the display 18*c*.

There are points in a transaction where information specific to a customer is to be displayed. This information is not in the configuration file 96 or in any content object. This situation is handled by using a dynamic text field. A dynamic text field in a content object can be populated with this customer-specific information (such as the customer's name, his or her bank balance, a fast-cash amount, or such like) at run-time. This is achieved using an Update command.

When the control program 80 receives customer-specific information, the application logic flow 82 issues an Update command to the presentation component 90 and includes this customer-specific information, and the unique identification of the content object to be modified by adding this customer-specific information. The updated control object is then presented to the customer on the display 18*c*.

Text differs from dynamic text in that text is typically the same for each customer (or at least the same for multiple customers); whereas, dynamic text is text that is intended to be replaced in real time by text associated with a customer. An example of text is the label for the transaction option "Withdraw" (which does not change between customers); an example of dynamic text is the current balance of the customer's bank account (which is unique to each customer).

Specific Example of an Information Flow Through Part of a Transaction

A specific example of an information flow through part of a transaction will now be described with reference to FIG. 5, which illustrates a sequence of frames of a single screen 112 (shown in broken line) during a customer transaction. Frames are different to screens because screens are asynchronous, that is, a screen is displayed until a user activity (or an extended period of inactivity) is detected; whereas a frame is synchronous and presented at a predetermined rate (for example, thirty frames per second). In this embodiment a single screen 112 is presented and information (content objects) flows on and off the screen 112.

Background Layer

Figure 5A:
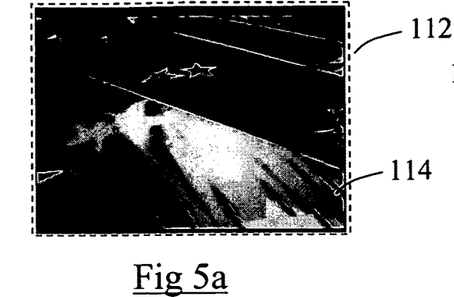
FIGS. 5*a* to 5*h* illustrate a sequence of frames of a single screen rendered by the presentation component on the terminal of FIG. 1 during a customer transaction.

In this example, the first layer is a background layer that will be displayed before, during, and after each transaction. The background layer comprises a video file of a flag blowing in the wind. This video file is rendered to fit the full screen 112 being presented. A single frame 114 from this video file is shown in FIG. 5*a*.

The video file ("Flag.avi") is stored in a directory on the disk drive 36 and a configuration file is created for this background layer ("background.xml"). In the configuration file, which is shown below, the video will be played in a central location on the screen 112. Initially, the video will be opaque, and there are two different animations that can be run on the background layer. A "Dim" animation reduces the opacity of the video to 50%; whereas, a "Bright" animation increases the opacity to 100%. There are two sequences that can be executed: a SessionStart sequence that applies the Dim animation so that the flag pales in the background at the start of a transaction, and a SessionEnd sequence that applies the Bright animation once a customer transaction has been completed. The background.xml file is shown below.

```
<Element Name="Background">
    <Movie Filename="Flag.avi" />
    <Position X="-0.0299999341" Y="-0.0299998932" Z="0" />
    <Rotation X="0" Y="0" Z="0" />
    <Scale X="9.410001" Y="7.20000124" />
    <Alpha Alpha="1" />
</Element>
<Animation Id="Dim">
<Keyframe Time="1.0">
    <Alpha Alpha="0.5" />
</Keyframe>
</Animation>
<Animation Id="Bright">
<Keyframe Time="1.0">
    <Alpha Alpha="1.0" />
</Keyframe>
</Animation>
<Sequence Name="SessionStart">
    <Animations Element="Background" AnimationId="Dim" />
</Sequence>
<Sequence Name="SessionEnd">
    <Animations Element="Background" AnimationId="Bright" />
</Sequence>
```

The background layer is displayed by the application logic flow 82 sending a "Show background.xml" command across the P.C. API 88. This causes the presentation component 90 to load up the background.xml file and to render the video according to that configuration file. If a customer inserts a card into the ATM card reader 18*a*, then the control program 80 detects this and the application logic flow 82 sends an "Animate SessionStart" command across the P.C. API 88. This causes the parser 92 to reduce the opacity of the video to 50, according to the Dim animation.

Branding Layer

Figure 5B:
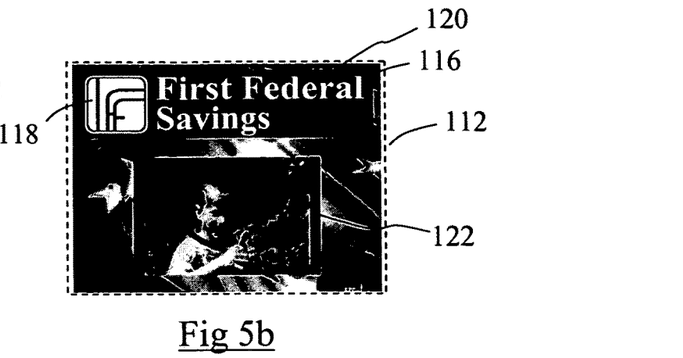

In addition to the background layer, a branding layer is provided. This layer has a corresponding configuration file (branding.xml) and includes four content objects: text, a logo, a rectangular box, and a video file. FIG. 5*b* illustrates the screen 112 showing the branding layer superimposed on the background layer.

The branding layer serves to identify the owner of the ATM. In this example, the text is "First Federal Savings" 116, the logo 118 is provided as a TIFF file, and the rectangular box 120 is slightly larger than the combination of the text 116 and the logo 18. The text 16 and logo 118 are initially opaque (alpha=1) and the box 120 has a transparency of 50%.

When superimposed on the background layer, as illustrated in FIG. 5*b*, the background layer is partly visible through the box 120 but not through the text 116 and logo 118. Because the branding layer is smaller than the background layer, there are areas of the background layer that are not covered by the branding layer.

The fourth content object on the branding layer is a video file ("boy.avi") 122 that will be presented in the center of the branding layer. The video file is displayed with 100% opacity (alpha=1), and loops continuously until a user enters a card.

When a user enters a card, the video file ("boy.avi") is removed, the other three content objects (the text 116, logo 118, and box 120) are initially made less opaque (as illustrated in FIG. 5b) and then shrunk and re-located to the lower left corner of the screen 112 (as can be seen in FIGS. 5e to 5h). The background layer is also faded to a lower opacity.

Transaction Selection Layer

The application logic flow 82 then sends a "Show transaction_screen.xml" command across the P.C. API 88, which causes a transaction configuration file called "transaction_screen.xml" to be loaded into memory 34. Individual chunks of the transaction_screen.xml file are shown below. The transaction_screen.xml file lists ten content objects.

The first two content objects comprise text.

```
<Element Name="BackgroundText">
    <Text Text="select" />
    <Position X="-3.6" Y="1.35" Z="-0.1" />
    <Scale X=".8" Y=".8" />
    <Alpha Alpha="0.0" />
</Element
<Element Name="BackgroundText2">
    <Text Text="transaction" />
    <Position X="-3.6" Y="1.05" Z="-0.1" />
    <Scale X=".6" Y=".6" />
    <Alpha Alpha="0.0" />
</Element>
```

The next four content objects are all the same. Each is an image of a button.

```
<Element Name="Button1">
    <Graphic Filename="button right.png" />
    <Position X="1.46" Y="0.3" Z="3.0" />
    <Scale X="4.4" Y="1.3" />
    <Alpha Alpha="0" />
</Element>
<Element Name="Button2">
    <Graphic Filename="button right.png" />
    <Position X="1.46" Y="-0.4" Z="3.0" />
    <Scale X="4.4" Y="1.3" />
    <Alpha Alpha = "0" />
</Element>
<Element Name="Button3">
    <Graphic Filename="button right.png" />
    <Position X="1.46" Y="-1.1" Z="3.0" />
    <Scale X="4.4" Y="1.3" />
    <Alpha Alpha="0" />
</Element>
<Element Name="Button4">
    <Graphic Filename="button right.png" />
    <Position X="1.46" Y="-1.8" Z="3.0" />
    <Scale X="4.4" Y="1.3" />
    <Alpha Alpha="0" />
</Element>
```

The next four content objects are all text. Each is a description of a transaction and is aligned with one of the four buttons listed above, so that each of the buttons extends beyond its corresponding text, and the text appears superimposed on its corresponding button.

```
<Element Name="ButtonText1">
    <Text Text="Withdrawal" />
    <Position X="1.6" Y="0.29" Z="3.1" />
    <Scale X="0.2" Y="0.2" />
    <Alpha Alpha = "0" />
</Element>
<Element Name="ButtonText2">
    <Text Text="Deposit" />
    <Position X="1.6" Y="-0.38" Z="3.1" />
    <Scale X="0.2" Y="0.2" />
    <Alpha Alpha="0" />
</Element>
<Element Name="ButtonText3">
    <Text Text="Balance Enquiry" />
    <Position X="1.6" Y="-1.1" Z="3.1" />
    <Scale X="0.2" Y="0.2" />
    <Alpha Alpha="0" />
</Element>
<Element Name="ButtonText4">
    <Text Text="Bill Payment" />
    <Position X="1.6" Y="-1.8" Z="3.1" />
    <Scale X="0.2" Y="0.2" />
    <Alpha Alpha="0" />
</Element>
```

The above file lists ten different content objects. Initially, all of the content objects are invisible (alpha=0 for all of them). In the animation part of the configuration file there are six different animations that can be applied to the above content objects: two are for removing the content objects from the screen (Exit.Simple and Exit.Left); and four are for adding the content objects to the screen (Enter.Opaque.Button, Enter.Opaque, Enter.TextSelect, and Enter.TextAmount). The Exit.Simple animation fades out the content object; whereas the Exit.Left animation fades out the content object and moves the content object to the left of the screen as viewed by the customer. The animations for removing the content objects from the screen are listed below.

```
<Animation Id="Exit.Simple">
    <Keyframe Time="0.5">
        <Position Z="-3" Behavior="Smooth" />
        <Alpha Alpha="0" />
    </Keyframe>
</Animation>
<Animation Id="Exit.Left">
    <Keyframe Time="0.5">
        <Position X="-2" Behavior="Smooth" />
        <Alpha Alpha="0" />
    </Keyframe>
</Animation>
```

The Enter.Opaque.Button animation makes the content object more opaque until 80% opacity is reached. The Enter.Opaque animation makes the content object more opaque until 100% opacity is reached. The Enter.TextSelect animation makes the content object more opaque until 50% opacity is reached and moves the text from left to right, as viewed by the customer. The Enter.TextAmount animation makes the content object more opaque until 50% opacity is reached and moves the text from left to right (further right than the Enter.TextSelect animation), as viewed by the customer.

The animations for adding the content objects to the screen are listed below.

```
<Animation Id="Enter.Opaque.Button">
    <Keyframe Time="1">
        <Position Z="0" Behavior="Smooth" />
        <Alpha Alpha="0.8" />
```

-continued

```
        </Keyframe>
    </Animation>
<Animation Id="Enter.Opaque">
<Keyframe Time="1">
    <Position Z="0" Behavior="Smooth" />
    <Alpha Alpha="1" />
    </Keyframe>
</Animation>
<Animation Id="Enter.TextSelect">
<Keyframe Time="1">
    <Position X="-1.6" Y="1.35" Z="-0.1" />
    <Alpha Alpha="0.5" />
    </Keyframe>
</Animation>
<Animation Id="Enter.TextAmount">
<Keyframe Time="1">
    <Position X="-0.6" Y="1.05" Z="-0.1" />
    <Alpha Alpha="0.5" />
    </Keyframe>
</Animation>
```

In the sequence part of the configuration file there are two sequences that can be applied. One sequence (LayerExit) is used to remove the content objects from the screen; the other sequence (LayerEnter) is used to add the content objects to the screen. These two sequences are listed below.

```
<Sequence Name="LayerExit">
    <Animations Element="Button1" AnimationId="Exit.Simple" />
    <Animations Element="Button2" AnimationId="Exit.Simple" />
    <Animations Element="Button3" AnimationId="Exit.Simple" />
    <Animations Element="Button4" AnimationId="Exit.Simple" />
    <Animations Element="Button5" AnimationId="Exit.Simple" />
    <Animations Element="Button6" AnimationId="Exit.Simple" />
    <Animations Element="Button7" AnimationId="Exit.Simple" />
    <Animations Element="Button8" AnimationId="Exit.Simple" />
    <Animations Element="ButtonText1" AnimationId="Exit.Simple" />
    <Animations Element="ButtonText2" AnimationId="Exit.Simple" />
    <Animations Element="ButtonText3" AnimationId="Exit.Simple" />
    <Animations Element="ButtonText4" AnimationId="Exit.Simple" />
    <Animations Element="BackgroundText"
    AnimationId="Exit.Left" />
    <Animations Element="BackgroundText2"
    AnimationId="Exit.Left" />
</Sequence>
<Sequence Name="LayerEnter">
<Animations Element="Button1" AnimationId="Enter.Opaque.Button" />
    <Animations Element="Button2"
    AnimationId="Enter.Opaque.Button" />
    <Animations Element="Button3"
    AnimationId="Enter.Opaque.Button" />
    <Animations Element="Button4"
    AnimationId="Enter.Opaque.Button" />
    <Animations Element="Button5"
    AnimationId="Enter.Opaque.Button" />
    <Animations Element="Button6"
    AnimationId="Enter.Opaque.Button" />
    <Animations Element="Button7"
    AnimationId="Enter.Opaque.Button" />
    <Animations Element="Button8"
    AnimationId="Enter.Opaque.Button" />
    <Animations Element="ButtonText1"
    AnimationId="Enter.Opaque" />
    <Animations Element="ButtonText2"
    AnimationId="Enter.Opaque" />
    <Animations Element="ButtonText3"
    AnimationId="Enter.Opaque" />
    <Animations Element="ButtonText4"
    AnimationId="Enter.Opaque" />
    <Animations Element="BackgroundText"
    AnimationId="Enter.TextSelect" />
    <Animations Element="BackgroundText2"
    AnimationId="Enter.TextAmount" />
</Sequence>
```

Figure 5C:
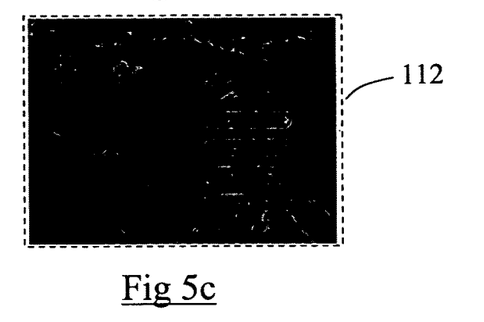

The application logic flow 82 then sends an "Animate LayerEnter" command across the P.C. API 88, which causes the parser 92 to apply the sequence LayerEnter to the ten content objects on the transaction selection layer. FIG. 5c is a frame taken while the branding layer is being animated out and the transaction selection layer is being animated in.

Figure 5D:
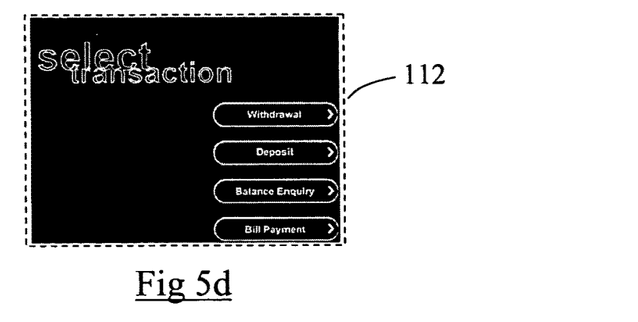
Figure 5E:
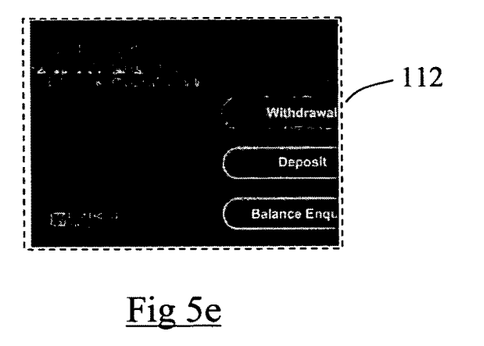

If the customer selects the Withdrawal transaction option (corresponding to the control for Button 1), then the parser 92 supplies this information to the application flow logic 82 via P.C. API 88. The application flow logic 82 then sends an "Animate LayerExit" command across the P.C. API 88, which causes the parser 92 to apply the sequence LayerExit to the ten content objects on the transaction selection layer. FIGS. 5d and 5e are frames taken while the transaction selection layer is being animated off the screen 112.

Transaction Amount Layer

Figure 5F:
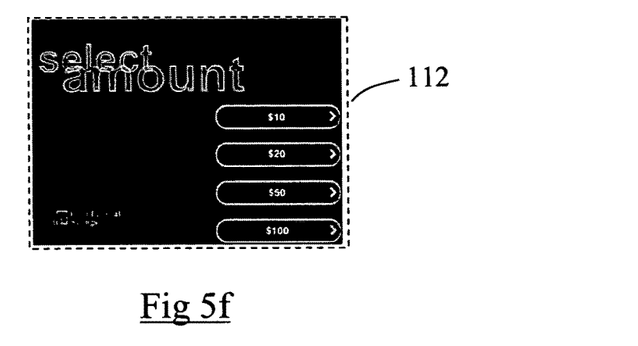

The application logic flow 82 then sends a "Show transaction_amount.xml" command across the P.C. API 88, which causes a transaction configuration file called "transaction_amount.xml" to be loaded into memory 34. The application logic flow 82 then sends an "Animate LayerEnter" command across the P.C. API 88, which causes the parser 92 to apply the sequence LayerEnter to the content objects referenced in the file called transaction_amount.xml. The xml code for this file is not provided herein as the skilled person will readily understand the content of this file from the previous xml file excerpts that have been provided. FIG. 5f illustrates the transaction amount information presented on the screen 112.

At some point, the application logic flow 82 sends a command called "Remove transaction_screen.xml" across the P.C. API 88 because the transaction screen layer is no longer required for this customer transaction. In response to this command, the presentation component 90 removes the transaction_screen.xml file from memory 34.

Figure 5G:
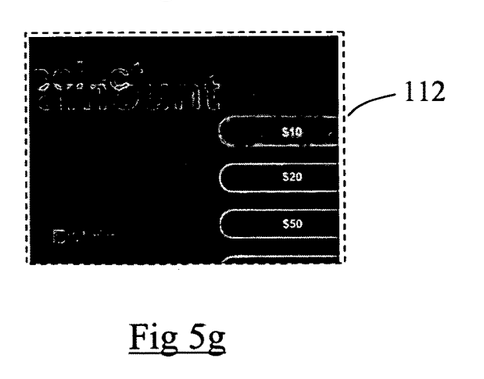
Figure 5H:
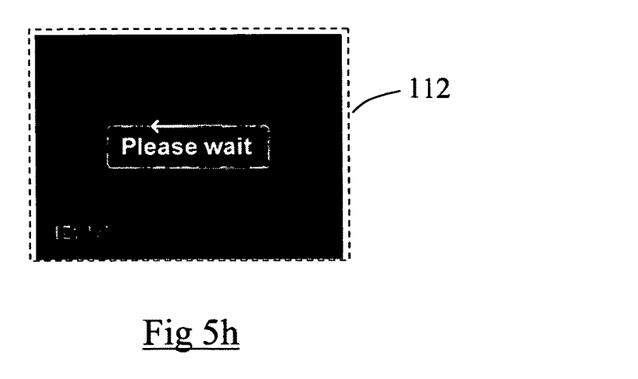

If the customer selects the "$10" transaction amount option, then the parser 92 supplies this information to the application flow logic 82 via P.C. API 88. The application flow logic 82 then sends an "Animate LayerExit" command across the P.C. API 88, which causes the parser 92 to apply the sequence LayerExit to the content objects on the transaction amount layer, as illustrated in FIG. 5g.

Wait Layer

The control program 80 then obtains authorization for executing the transaction. When this is received, the application flow logic 82 sends a "Show wait.xml" command across the P.C. API 88, followed by an "Animate LoopEnter" command which causes the parser 92 to present the text "Please wait" located inside a box and having an arrow looping continuously around the box.

The requested cash ($10) is then dispensed to the customer by the ATM 10, and the application logic flow 82 commands the parser 92 to remove the wait layer and to show the background layer and the branding layer until the next customer arrives at the ATM 10.

It will be appreciated that for the purposes of simplicity and clarity only a few layers have been described. In commercial applications there would be additional layers, such as a PIN pad layer.

It will also be appreciated that this example allows a full range of advanced graphical features to be presented to a customer on a single screen, with content objects being shown, animated on, and animated off the screen. This allows, for example, a video to be played continuously through a customer transaction.

It will now be appreciated that the presentation component is able to compose content objects in a conceptual three-dimensional world, and can render snapshots of that world on an SST display at full motion video rates.

It will now be appreciated that because the content objects and animations are defined in configuration files separately from the presentation component, but interpreted by the presentation component, the content objects and animations can be changed without having to re-compile an application.

By using keyframes to reference low-level routines (for example, in a DLL library of graphical manipulation routines), advanced user interface interaction techniques can be harnessed and used by people with no specialized graphics programming experience.

Various modifications may be made to the above embodiment within the scope of the present invention. For example, in the above embodiment, a lobby ATM was used; whereas in other embodiments, different types of ATMs (through-the-wall, countertop, and such like) may be used, or non-ATM terminals may be used, such as postal kiosks, self-checkout terminals, airline kiosks, hotel kiosks, and such like.

In the above embodiment, a Windows operating system was used. In other embodiments, a different operating system (for example, Linux, Mac, Solaris) may be used.

It should be appreciated that the particular structure used to implement the functions described in the above embodiment is a matter of design choice, for example, the control application 80 may be implemented as a single monolithic program, as a set of discrete objects that can interact with one another, or in some other way.

In the above embodiment only a few keyframes were described. It should be appreciated that many different keyframes can be created to provide different visual effects, including sparkling, shimmering, glowing, pulsing, and many other effects and transformations.

In the above embodiment there are pointers to content objects, instructions relating to the content objects, and a unique identification for each content object. In other embodiments, there may only be a single identification for a group of associated content objects; for example, transaction options on a main menu may all be grouped and referenced by a single identification. In such embodiments, any keyframe that is applied to the identification is applied to each of the objects in the group.

Although the above embodiment is described with reference to the customer display 18*c*, the presentation component 90 may also control display of information on a rear operator panel (not shown) used by maintenance and replenishment personnel.

Although in the above embodiment the "Show" command references a layer (a configuration file) and the "Animate" command references one or more objects in the configuration file that have been loaded into memory 34, in other embodiments, a single configuration file may be used and loaded up initially, and the "Show" command may be applied to one or more content objects.

What is claimed is:
1. An automated teller machine (ATM), comprising:
a controller which:
i) controls operation of the ATM during an ATM transaction including sequencing of a plurality of ATM transaction screens wherein at least one of the plurality of ATM transaction screens includes a first layer and a second layer that is independently and dynamically controllable from the first layer based on user interaction during the ATM transaction; and
ii) accepts data from a user during the ATM transaction;
a storage system which stores:
i) data files, each of which
A) is identified by a label and
B) contains data which represents content that is presented in the plurality of ATM transaction screens and the content includes one or more transaction screen images, wherein the content is programmatically animated as transformations that are changed with respect to: presentation positions on a display device of the ATM, presentation scale on the display device, and presentation transparency with respect to other presented objects on the display device during the ATM transaction;
ii) configuration files, each configuration file is an extensible Markup Language (XML) file and the configuration files including instructions relating to how to render the plurality of ATM transaction screens, including first instructions for rendering the first layer with first content and second instructions for rendering the second layer with second content during display of the at least one of the plurality of ATM transaction screens, and each XML file including a pointer a particular label for accessing a particular data file and that data file's data represented as the content having the one or more transaction screen images; and
the display device for displaying the plurality of ATM transaction screens;
wherein the controller determines that the at least one of the plurality of ATM transaction screens should be displayed by the display device, processes the data files and configuration files to generate the first layer including the first content and to generate the second layer including the second content, and causes simultaneously displaying of the first layer and the second layer on the display device, wherein the configuration files dictate how the content in the plurality of ATM transaction screens will dynamically adapt during a customer transaction based on real-time user inputs, and not the controller, wherein the controller accesses the configuration files based on specific commands being processed by the controller to obtain the content through the pointer provided in the configuration files and to process the instructions that define how to render the content in the plurality of ATM transaction screens;
wherein the ATM further includes:
a processor;
a memory;
wherein the controller is executable instructions that are executed on the processor, and wherein the configuration files are loaded into memory when the controller is executed by the processor from a non-transitory computer-readable storage medium of the ATM;
wherein a presentation component renders the first layer and the second layer on the display at a rate of at least thirty frames per second, and wherein the configuration files are processed in response to commands received from application flow logic via a presentation component application programming interface (API), wherein the API allows another program to: load the configuration files into memory, initiate information flow, remove a layer, modify content on a layer, change keyframes applied to content on a layer, and animate content on a layer;
a graphics card coupled to the display device, wherein the controller sends low-level graphics commands based upon the instructions to the graphics card through an application programming interface; and a parser to interrupt keyframes to access a library of graphic manipulation files.

2. ATM according to claim 1, in which, the content includes images, and for each of the images stored in one of the data files, a corresponding configuration file contains instructions which determine opacity, position, duration, and rotation of a corresponding displayed image.

3. ATM according to claim 1, in which, the content includes images, and for each of the images stored in one of the data files, a corresponding configuration file contains instructions which determine relative size and starting and ending points of movement of a corresponding displayed image.

4. ATM according to claim 1 in which the content includes images, and the ATM further comprises instructions of one of the configuration files which cause an associated image to appear with a given degree of opacity, and then disappear.

5. ATM according to claim 1 in which the content includes images, and wherein the ATM further comprises instructions of one of the configuration files which cause an associated image to grow larger over time.

6. ATM according to claim 1 in which the content includes images, and wherein the ATM further comprises instructions of one of the configuration files which cause an associated image to (1) move from a start position to an end position, (2) grow or shrink over time, and (3) change in opacity over time.

7. ATM according to claim 1 in which the first layer comprises a background layer including an image, over which text is displayed, with an amount of opacity which is determined by the first instructions.

8. ATM according to claim 1 in which the first layer comprises a background layer including an image, and the second layer comprises text through which the image can be partially seen.

9. ATM according to claim 1, in which the first layer comprises a background layer including an image, and the second layer comprises buttons, or labels for buttons, to appear on the display device, over the background layer.

10. ATM according to claim 1, in which the content comprises text, which is displayed on the display device.

11. ATM according to claim 1, in which the content comprises images, and the images include buttons which a customer actuates.

12. ATM according to claim 1, in which the content comprises images, and the images include labels for buttons which a customer actuates.

13. ATM according to claim 1, wherein the controller controls display of customer-specific information by populating a dynamic text field with the customer-specific information at run time.

14. ATM according to claim 1, wherein the first layer is a background layer and the second layer is a branding layer.

15. ATM according to claim 14, wherein the branding layer serves to identify an owner of the ATM.

16. ATM according to claim 14 further comprising a third layer which is a transaction selection layer.

17. ATM according to claim 16 further comprising a fourth layer which is a transaction amount layer.

18. ATM according to claim 17 further comprising a fifth layer which is a wait layer.

* * * * *